(12) United States Patent
Nakagawa et al.

(10) Patent No.: US 8,922,080 B2
(45) Date of Patent: Dec. 30, 2014

(54) BUS BAR, MOTOR, AND PROCESS FOR PRODUCING THESE

(75) Inventors: Airi Nakagawa, Kyoto (JP); Tomoyoshi Yokogawa, Kyoto (JP); Tsuyoshi Hirokawa, Kyoto (JP); Takahiro Hattori, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/822,657

(22) PCT Filed: Oct. 28, 2011

(86) PCT No.: PCT/JP2011/006044
§ 371 (c)(1),
(2), (4) Date: Mar. 13, 2013

(87) PCT Pub. No.: WO2012/056714
PCT Pub. Date: May 3, 2012

(65) Prior Publication Data
US 2013/0181569 A1    Jul. 18, 2013

(30) Foreign Application Priority Data

Oct. 29, 2010   (JP) ................................. 2010-243513
Mar. 31, 2011   (JP) ................................. 2011-079427

(51) Int. Cl.
   H02K 3/50      (2006.01)
   H01R 43/16     (2006.01)
   H02K 3/52      (2006.01)
   H02K 3/00      (2006.01)
   H01R 39/32     (2006.01)

(52) U.S. Cl.
   CPC ............... *H01R 43/16* (2013.01); *H02K 3/522* (2013.01); *H02K 3/00* (2013.01); *H01R 39/32* (2013.01)
   USPC .......................................... 310/71

(58) Field of Classification Search
   USPC .......................................... 310/71
   See application file for complete search history.

(56) References Cited

U.S. PATENT DOCUMENTS

| 6,914,356 | B2 * | 7/2005 | Yamamura et al. ............. 310/71 |
| 7,709,982 | B2 * | 5/2010 | Ohuchi et al. .................. 310/71 |
| 7,723,878 | B2 * | 5/2010 | Yagai et al. ..................... 310/71 |
| 2008/0242124 | A1 | 10/2008 | Otsuji et al. |
| 2010/0033044 | A1 * | 2/2010 | Isshiki et al. ................... 310/71 |

FOREIGN PATENT DOCUMENTS

| JP | 06-233483 A | 8/1994 |
| JP | 2000-333400 A | 11/2000 |
| JP | 2003-324887 A | 11/2003 |

(Continued)

OTHER PUBLICATIONS

Takagi et al., JP 2003-324887, Nov. 2003, English Machine Translation.*

(Continued)

*Primary Examiner* — Burton Mullins
(74) *Attorney, Agent, or Firm* — Keating & Bennett, LLP (57) ABSTRACT

A bus bar which electrically connects end portions of a plurality of conductive lines and a method for manufacturing the bus bar are such that an intermediate region of a single wire rod is folded to define a plurality of terminal forming portions extending to a lateral direction of the wire rod. The whole wire rod including the terminal forming portion is rolled. The rolled wire rod is bent into a certain shape.

14 Claims, 8 Drawing Sheets

(56) References Cited

FOREIGN PATENT DOCUMENTS

| | | |
|---|---|---|
| JP | 3650372 B2 | 5/2005 |
| JP | 2005-160137 A | 6/2005 |
| JP | 2006-180615 A | 7/2006 |
| JP | 2007-028759 A | 2/2007 |

OTHER PUBLICATIONS

Official Communication issued in International Patent Application No. PCT/JP2011/006044, mailed on Apr. 17, 2012.

* cited by examiner

BUS BAR, MOTOR, AND PROCESS FOR PRODUCING THESE

BACKGROUND OF THE INVENTION

1. Field of the Invention

The present invention relates to a bus bar arranged to be electrically connected with the end portions of a plurality of conductive lines led out from a coil, and a process for producing the same.

2. Description of the Related Art

A press-molded, strip-shaped conductor is commonly used as a bus bar. A strip-shaped conductor is usually formed by punching a metal plate into an intermediate member with a certain shape laying out a strip-shaped conductor, and then bending a certain portion of said intermediate member e.g. JP-A 2000-333400.

Further, in addition to the strip-shaped conductor, a rotating electrical machine is disclosed JP-B 3650372, which uses a conductive line as a connecting conductor bus bar. The connecting conductor disclosed in JP-B 3650372 is formed by bending a conductive line with a circular or rectangular cross section into a certain shape. Specifically, a ring-shaped receiving portion, and a terminal portion for coil connection protruding from four places of the receiving portion toward the external diameter direction in a radial shape are formed by bending a single conductive line having a circular cross section.

The terminal portion for coil connection is formed by bending and folding the conductive line by 180 degrees at a front end. In order to prevent the folded conductive line from being spread again, the base of the terminal portion for coil connection is joined by TIG welding. On the front end of the terminal portion for coil connection, a ring-shaped portion is formed for inserting a lead line of the coil. Also, a connecting conductor formed by making the receiving section level in the diameter direction into a flat shape is disclosed as well.

In the rotating electrical machine, three connecting conductors are received in a ring-shaped holder. The holder has three receiving grooves with different depths, arranged in a concentrically circular form, where receiving portions of each connecting conductor are respectively received.

Generally, a bus bar has protruding terminals formed on multiple places, and therefore its layout form is complicated. Accordingly, when a bus bar is formed by punching a metal plate into an intermediate member to produce a strip-shaped conductor, metal scraps are generated after the punching process and causes a decrease in the yield rate. Various studies regarding the shape of the bus bar or the positioning of the intermediate member when punching the metal plate are being conducted in order to improve the yield rate; however, the current situation is that several tens of a percent of metal plate are being wasted.

In such regard, when producing a connecting conductor by using a conductive line as in JP-B 3650372, metal scraps are not generated and the problem of yield rate as in the strip-shaped conductor does not occur.

However, since the connecting conductor in JP-B 3650372 forms the terminal portion for coil connection only by folding the conductive line, it requires welding of the base portion, which is a disadvantage in workability. Also, the connecting conductor is difficult to be received in the holder due to the thickness of the terminal portion for coil connection, which makes it difficult to handle compared to the strip-shaped conductor. Further, in the terminal portion for coil connection of JP-B 3650372, a plurality of coil lead lines are simultaneously inserted to the end portion for coil connection, either caulking or welding is required, and manual operations or arrangements of complex manufacturing devices or processes are required.

SUMMARY OF THE INVENTION

A preferred embodiment of the present invention provides a method for manufacturing a bus bar which electrically connects end portions of a plurality of conductive lines. The method includes a step of forming a plurality of terminal forming portions, a step of rolling the whole wire rod, and a step of bending the wire rod into a certain shape. In the step of forming a plurality of terminal forming portions, the intermediate portion of a single wire rod is folded to form a plurality of terminal forming portions which protrude toward a lateral direction of the wire rod. In the step of rolling the whole wire rod, the whole wire rod is rolled including the terminal forming portion. In the step of bending the wire rod into a certain shape, the rolled wire rod is bent into a certain shape.

The bus bar according to another preferred embodiment of the present invention includes a body portion in a plate-shape, and a plurality of terminal portions in a plate-shape integrally provided with the body portion as a single monolithic element to correspond to the arrangement of end portions of the conductive lines. The terminal portion includes a terminal protrusion portion including a pair of extending portions which protrude toward a lateral direction from the body portion, facing each other, and a terminal front end extending from the terminal protrusion portion.

An additional preferred embodiment of the present invention provides a method for manufacturing a bus bar which electrically connects end portions of a plurality of conductive lines. The method according to the present preferred embodiment includes a step of forming a plurality of terminal forming portions, a step of forming a connecting end forming portion, a step of rolling the whole wire rod, and a step of bending the wire rod into a certain shape. In the step of forming a plurality of terminal forming portions, a single, linear-shaped wire rod is folded in the intermediate portion to form a plurality of terminal forming portions which protrude toward a lateral direction of the wire rod. In the step of forming a connecting end forming portion, each of two ends of a wire rod is folded in the opposite direction from the terminal forming portion with respect to the linear-shaped wire rod. In the step of rolling the whole wire rod, the rolling process is performed on the whole wire rod including the terminal forming portion. In the step of bending the wire rod into a certain shape, the rolled wire rod is bent into a certain shape.

As explained above, the preferred embodiments of the present invention provide a bus bar that can be handled easily as a strip-shaped conductor, and does not have the problem of yield rate.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Set forth below are detailed descriptions of preferred embodiments of the present invention based on the drawings. Yet, the descriptions below are substantially examples, and they do not necessarily imply any limitations on the present invention, where it is applied to or how it is used.

Figure 1:
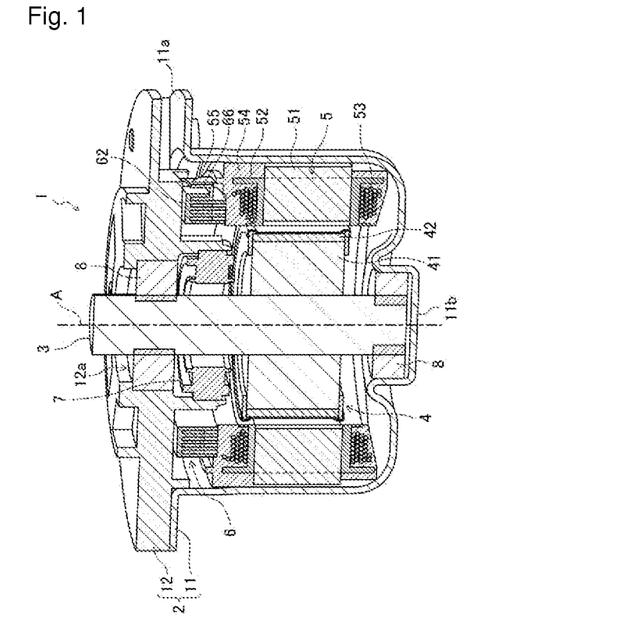
FIG. 1 is a schematic sectional view illustrating the motor according to a preferred embodiment of the present invention.

FIG. 1 illustrates the motor according to a preferred embodiment of the present invention. The motor 1 is preferably an inner-rotor type brushless motor. The motor 1 preferably includes a casing 2, a shaft 3, a rotor 4, a stator 5, a bus bar unit 6, and a rotation angle sensor 7. The centers of the rotor 4, the stator 5, and the bus bar unit 6 are positioned so that they all coincide or approximately coincide with the central axis A.

The casing 2 preferably includes a cylindrical casing 11 having an opening at one end and a disc-shaped cover 12. A flange 11a protrudes out around the opening end of the casing 11. The cover 12 is fixedly joined to the flange 11a. A shaft window 12a is opened on the center portion of the cover 12. A bearing portion 11b is arranged on the bottom surface of the casing 11 to be opposed to the shaft window 12a. The shaft 3 is provided inside the casing 11 closed by the cover 12.

A bearing 8 is provided in each inside of the bearing portion 11b and the shaft window 12a. The shaft 3 is rotatably supported with respect to the casing 2 through the bearings 8, 8. One end portion of the shaft 3 protrudes toward the outside of the cover 12 through the shaft window 12a. The rotation driving power of the motor 1 is outputted through the end portion.

On the center portion of the shaft 3, a rotor 4 is fixed in a concentric manner. The rotor 4 includes a cylindrical rotor core and a magnet 42. The magnet 42 is provided on the outer circumferential surface of the rotor core 41. The magnetic poles of the magnet 42 are arranged so that the N-pole and the S-pole is alternatively disposed in a circumferential direction. A cylindrical stator 5 is arranged on the circumference of the rotor 4. The stator 5 is fixed on the inside of the casing 11. The inner circumferential surface of the stator 5 is disposed to face the outer circumferential surface of the rotor 4 with a slight interval therebetween.

Figure 2:
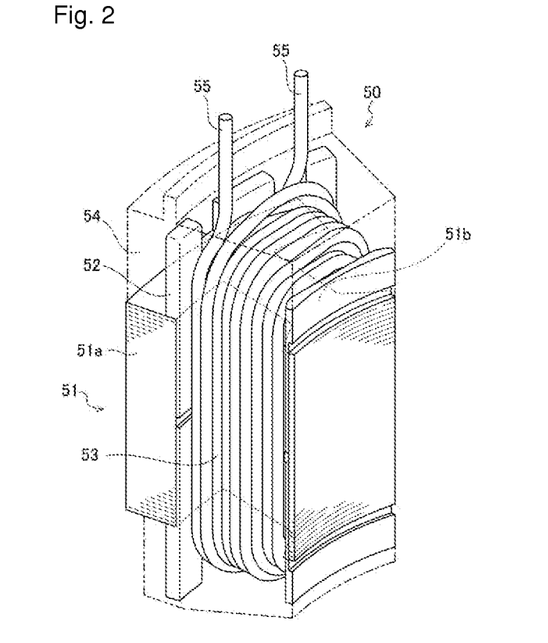
FIG. 2 is a schematic perspective view illustrating the divisional stator according to a preferred embodiment of the present invention.

The stator 5 is preferably defined by connecting a plurality of divisional stators 50 (preferably twelve divisional stators 50 in the present preferred embodiment). As illustrated in FIG. 2, each of the divisional stators 50 preferably includes a divisional core 51, an insulator 52, a coil 53, and a resin layer 54. Specifically, the divisional core 51 is preferably defined by layering a plurality of approximately T-shaped steel sheets. The divisional core 51 includes a core back 51a and a teeth 51b extending toward the center of a diameter direction from the center portion of the core back 51a, both of which are connected to each other. An insulator 52 including an electrically insulating property is installed on the divisional core 51.

The coil 53 is preferably defined by winding a conductive line such as, for example, a copper wire with enamel coating onto each of the teeth 51*b* provided with an insulator 52. Accordingly, in the present preferred embodiment, twelve coils 53 are preferably provided, for example. Two end portions of the conductive line (wire ends 55) wound around the teeth 51*b* are both led out from one end portion of the divisional stator 50. These wire ends 55 become parallel or substantially parallel to the shaft 3 when installed in the motor 1. Also, since the wire end 55 is led out from every divisional stator 50, 24 wire ends 55 are led out from the stator 5 in the present preferred embodiment.

The coil 53 is preferably molded by a resin layer 54 except for the front ends of the two wire ends 55. Since the base end of the wire end 55 is molded with the resin layer 54, the wire end 55 is positioned at a certain location. Also, by molding the base end with the resin layer 54, the front end of the wire end 55 which protrudes from the resin layer 54 is difficult to bend, which makes it possible to stably keep the front end of the wire end 55 in a straight line. Further, since the wire end 55 is molded in a fixed state by a jig, the positioning accuracy of the protruding portion of the wire end 55 is increased when compared to an unmolded wire end. Therefore, the connecting process of the wire end 55 and a terminal portion 66 described later can be easily performed. The arrangement of the wire end 55 will be further described later.

Figure 3:
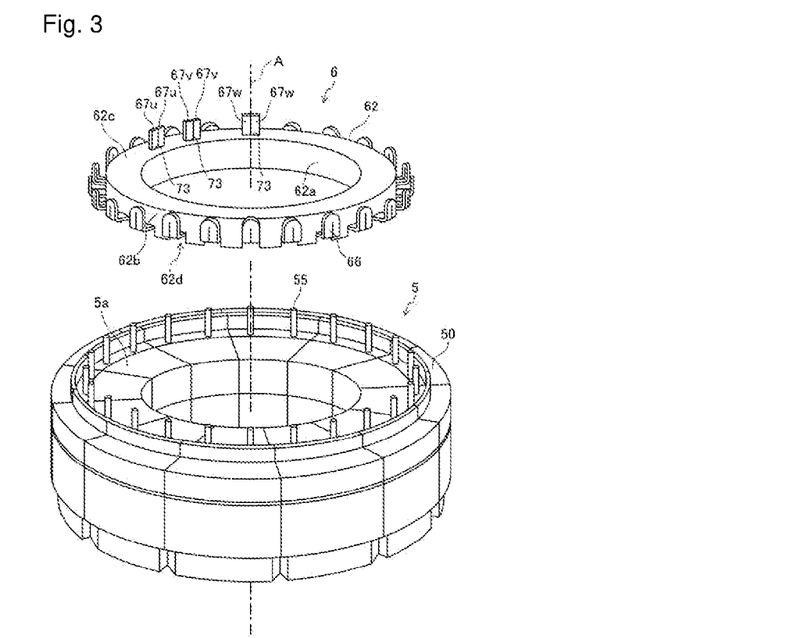
FIG. 3 is a schematic perspective view illustrating the stator and the bus bar unit according to a preferred embodiment of the present invention.

As illustrated in FIG. 3, a bus bar unit 6 is preferably attached to one end portion at the opening side and the output side of the casing 11 of the stator 5 where the wire ends 55 are led out.

Figure 4:
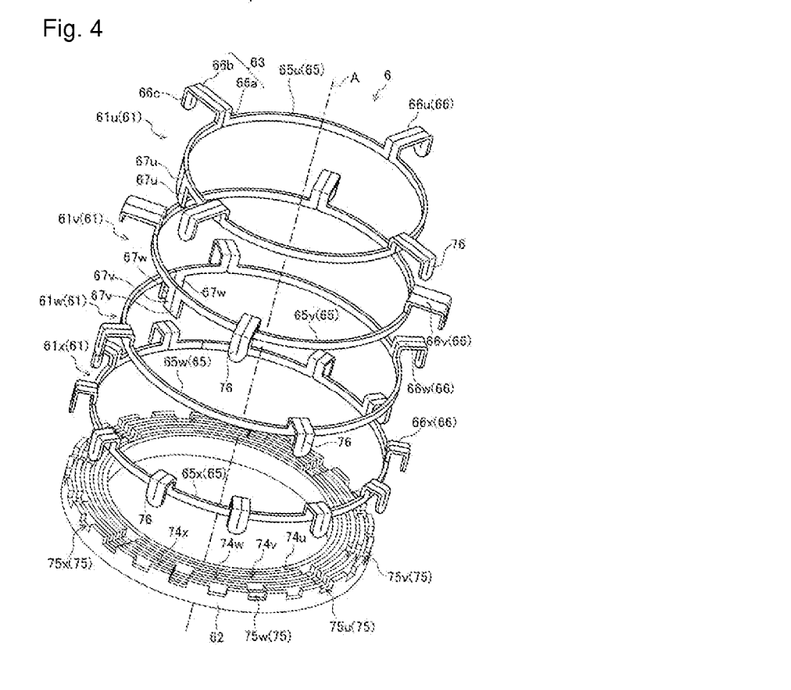
FIG. 4 is a disassembled perspective view schematically illustrating the bus bar unit according to a preferred embodiment of the present invention.
Figure 5:
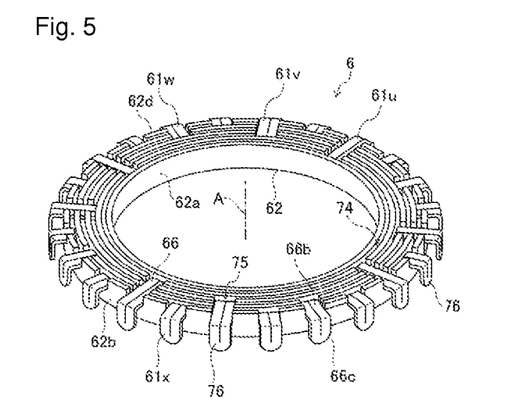
FIG. 5 is a schematic perspective view viewing the bus bar unit from the rear surface according to a preferred embodiment of the present invention.

As illustrated in FIG. 4 and FIG. 5, the bus bar unit 6 includes a plurality of bus bars 61 (preferably four in the present preferred embodiment), and an insulating adapter 62 supporting the bus bars 61.

The bus bar 61 according to the present preferred embodiment preferably includes three phase bus bars 61*u*, 61*v*, and 61*w* respectively connected to a U-phase, V-phase, and W-phase of the stator 5, and one common bus bar 61*x* connected to a neutral point. That is, each coil 53 of the present preferred embodiment is preferably arranged in Y-connection.

The bus bar 61 is a preferably strip-shaped conductor having the same or approximately the same thickness along the length. The bus bar 61 includes a body portion 65 in a strip plate shape curved into a ring around the central axis A, and a plurality of terminal portions 66 in a strip plate shape are integral with the body portion 65 as a single monolithic member. The body portion 65 and the terminal portion 66 are preferably made of one member. In the present preferred embodiment, four terminal portions 66*u*, 66*v*, 66*w* are preferably defined on each of the body portions 65*u*, 65*v*, 65*w* of the phase bus bars 61*u*, 61*v*, 61*w*, for example. Also, twelve terminal portions 66*x* are preferably defined on the body portion 65*x* of the common bus bar 61*x*, for example. Hereinafter, when there is no need to identify the U-phase, V-phase, W-phase, and common phase, they will be referred as a "bus bar 61" without specifying u, v, w, and x.

Also, each of the phase bus bars 61*u*, 61*v*, 61*w* preferably includes two connecting end portions 67*u*, 67*v*, 67*w* in a strip plate shape in some cases, one connecting end portion by joining each other integrally defined with the body portion 65 as a single monolithic member. The connecting end portions 67*u*, 67*v*, 67*w* are made of one member together with the body portion 65 and the terminal portion 66. The connecting end portion 67 preferably has a rectangular or substantially rectangular shape, and is extended toward an axial direction from each of two ends of the body portion 65. Further, an axial direction refers to the direction along the central axis A, hereinafter, will be referred to as the axial direction. The connecting end portion 67 is preferably arranged to be opposed to the terminal portion 66 in the axial direction with the body portion 65 therebetween. Each of the terminal portions (66, 66*u*, 66*v*, 66*w*, 66*x*) is preferably provided with a hook shape, and arranged in a certain position at the lateral end of the body portion 65. The terminal portion 66 includes a terminal protrusion portion 63 protruding toward a lateral direction from an intermediate region of the body portion 65 in the length direction, and a terminal front end 66*c* extending from the front end of the terminal protrusion portion 63. Specifically, the terminal protrusion portion 63 preferably includes a terminal base 66*a* and a terminal intermediate 66*b*. The terminal base 66*a* having a short length and protruding towards a lateral direction from a certain position of the lateral end of the body portion 65 and extends toward a direction orthogonal or approximately orthogonal to the body portion 65. The terminal intermediate 66*b* extends from the front end of the terminal base 66*a*, and bends to the radial direction of the body portion 65 to extend toward a direction orthogonal or approximately orthogonal to the terminal base 66*a*. The terminal front end 66*c* extends from the terminal intermediate 66*b*, bends to be opposed to the body portion 65, and to extend toward a direction orthogonal or approximately orthogonal to the terminal intermediate 66*b*.

A bus bar 61 is preferably formed by processing a single bare wire e.g. bare copper wire 68 without insulated coating.

Figure 6:
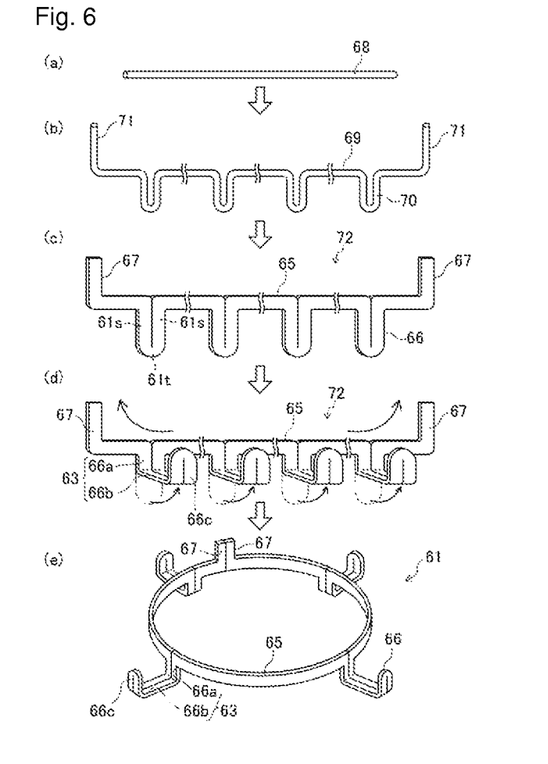
FIG. 6a is a schematic view illustrating the bus bar and the manufacturing process thereof according to a preferred embodiment of the present invention.
FIG. 6b is a schematic view illustrating the bus bar and the manufacturing process thereof according to a preferred embodiment of the present invention.
FIG. 6c is a schematic view illustrating the bus bar and the manufacturing process thereof according to a preferred embodiment of the present invention.
FIG. 6d is a schematic view illustrating the bus bar and the manufacturing process thereof according to a preferred embodiment of the present invention.
FIG. 6e is a schematic view illustrating the bus bar and the manufacturing process thereof according to a preferred embodiment of the present invention.

FIGS. 6*a*-6*d* illustrate the manufacturing process of a bus bar 61. First of all, as illustrated in FIG. 6*a*, a single bare copper wire 68 wire rod having a certain length is prepared. The bare copper wire 68 can be a commercial product, for example, having a diameter of about 2 mm. Subsequently, as illustrated in FIG. 6*b*, by folding the bare copper wire 68, a body forming portion 69 to form the body portion 65, a terminal forming portion 70 to form the terminal portion 66, and a connecting end forming portion 71 to form the connecting end portion 67 are formed. Specifically, when forming the terminal forming portion 70, a certain position at the intermediate region of the bare copper wire 68 is bent, and then the portions of the bare copper wire 68 extending from the bent point and opposing each other are made to get closer to be parallel or substantially parallel. The bare copper wire 68 is bent at a certain position by approximately 90 degrees to the opposite direction of the front end of the bent bare copper wire 68.

By repeating this procedure, a plurality of terminal forming portions 70 protruding orthogonally or approximately orthogonally to the body forming portion 69 extending in a straight line in the lateral direction are formed. Four terminal forming portions 70 are preferably formed in the phase bus bar 61, and twelve terminal forming portions 70 are preferably formed in the common bus bar 61*x*, for example. All terminal forming portions 70 are arranged on the same side of the body forming portion 69. The connecting end forming portion 71 is formed by bending each of two ends of the bare copper wire 68 by approximately 90 degrees to the opposite side of the terminal forming portion 70 with respect to the body forming portion 69. The terminal forming portion 70 and the connecting end forming portion 71 are formed on the same plane in a parallel or substantially parallel position relative to each other. Since the common bus bar 61*x* does not have a connecting end portion 67, a connecting end forming portion 71 is not formed in the common bus bar 61*x*.

Subsequently, as illustrated in FIG. 6c, the intermediate member 72 is preferably formed by rolling the whole bare copper wire 68 where the terminal forming portion 70 is formed, in a direction orthogonal or substantially orthogonal to the bending direction. By rolling the whole bare copper wire 68, the intermediate member 72 is formed in a shape of spread strip plate. If such intermediate member 72 is formed by punching a metal plate, a large quantity of metal scrap would be generated after the punching process; however, the present manufacturing method does not produce any metal scraps. Accordingly, manufacturing an intermediate member 72 with a 100% yield rate can be realized.

The body forming portion 69 and the connecting end forming portion 71 are respectively rolled to form a body portion 65 and a connecting end portion 67 in a strip plate shape having approximately the same width. In the terminal forming portion 70, a terminal portion 66 having a larger width is formed by rolling and integrating the portions of the bare copper wire 68 extending from the bent point in parallel or substantially in parallel opposing each other.

Specifically, a pair of a strip plate shaped portions extended portion 61s rolled into approximately identical width to the body portion 54 is protruded facing each other from the body portion 65 in the lateral direction. Each of a pair of the extended portions 61s is extended to and integrally formed with a front end portion front end 61t formed in a U-shape by rolling the bent portion of the bare copper wire 68. The pair of extended portions 61s or the front end 61t may be integrally formed by transformation by the rolling process. A terminal protrusion portion 63 is formed by the pair of extended portions 61s described above, and a terminal front end 66c is formed by the front end 61t described above.

Finally, as illustrated in FIG. 6d, by bending a certain region of the intermediate member 72, the bus bar is completed. Specifically, a terminal base 66a is formed by bending the base portion of each terminal portion 66 by approximately 90 degrees. Further, the intermediate portion of each terminal portion 66 is folded by approximately 90 degrees to form a terminal intermediate 66b and a terminal front end 66c. Then, the body portion 65 is folded in the thickness direction so that the connecting end portions 67 face each other in a common bus bar 61x, the end portions of the body portion 65 will face each other, to be formed into a ring shape as illustrated in FIG. 6e.

The terminal forming portion 70 of each phase bus bar 61 is formed such that the forming portions 70 of the phase bus bars 61 will have different lengths from one another. Each terminal base 66a of the phase bus bar 61 is formed with the same length. Accordingly, each terminal intermediate 66b of the phase bus bar 61 is formed to have a different length. Further, the body forming portion 69 of each phase bus bar 61 of each phase is formed with a different length. Accordingly, the body portion 65 of each phase bus bar 61 is formed with a different diameter to one another.

The terminal forming portion 70 of the common bus bar 61x according to the present preferred embodiment is preferably provided with a shorter length than the phase bus bar 61. The length of the terminal base 66a and the length of the terminal front end 66c are the same for the phase bus bar 61 and the common bus bar 61x, and the length of the terminal intermediate 66b is shorter for the common bus bar 61x than the phase bus bar 61. Although the common bus bar 61x has a greater number of terminal portions 66 than the phase bus bar 61, it is possible to reduce the consumed amount of bare copper wire 68 by making the size of the terminal portion 66 relatively shorter.

The adapter 62 is preferably an injection molding product of a resin. The adapter 62 according to the present preferred embodiment is preferably formed with a circular ring shape in accordance with the shape of the stator 5. The cross section of the adapter 62 is rectangular.

As illustrated in FIG. 3 or FIG. 5, the adapter 62 preferably includes a inner circumferential surface 62a and an outer circumferential surface 62b shaping a concentric circle and facing each other, and a pair of top end surface 62c and rear end surface 62d, extending from each rim of the inner circumferential surface 62a and the outer circumferential surface 62b and facing each other. The top end surface 62c of an adapter 62 preferably includes three openings of a terminal hole 73. The connecting end portion 67 of each phase bus bar 61 is protruded through these terminal holes 73. The rear end surface 62d of the adapter 62 includes a plurality of body supporting grooves 74 (preferably four in the present preferred embodiment, for example) and a plurality of terminal supporting grooves 75 (preferably twenty-four in the present preferred embodiment, for example).

As illustrated in FIG. 7 or FIGS. 8a-8d, the body supporting grooves 74 is preferably a circular ring shaped groove, and are arranged multiply in a concentric layout. The body supporting groove 74 has a little larger width than the thickness of the body portion 65 of the bus bar. According to the present preferred embodiment, three body supporting grooves 74u, 74v, 74w, a first body supporting groove to a third body supporting groove, are arranged on the inside of the radial direction, which receives the body portion 65 of the phase bus bar 61, and a fourth body supporting groove 74x is arranged at an outermost location, which receives the body portion 65x of the common bus bar 61x. The depths of the first body supporting groove to the fourth body supporting groove 74 are preferably all the same.

The terminal supporting grooves 75 are grooves extending in a radial direction to cross the body supporting groove 74. Each of the terminal supporting grooves 75 is arranged radially. The width of the terminal supporting grooves 75 is set to be a little larger than that of the terminal portion 66 of the bus bar. The terminal supporting grooves 75 are preferably arranged in equal intervals at twenty-four places in a circumferential direction, for example. The terminal supporting groove 75 according to the present preferred embodiment includes a first terminal supporting groove to a fourth terminal supporting groove 75u, 75v, 75w, 75x which respectively extends to the first to the fourth body supporting grooves 74 see FIG. 4.

The fourth terminal supporting groove 75x is arranged in equal intervals at twelve places in a circumferential direction, for example. The first to the third terminal supporting grooves 75 are arranged one by one between the fourth terminal supporting groove 75x, for example, in a counterclockwise direction, in the order of the first terminal supporting groove 75u, the second terminal supporting groove 75v, and the third terminal supporting groove 75w. The depths of the first to the fourth terminal supporting grooves 75 are all the same.

Each of the first to the fourth terminal supporting groove 75 preferably have different lengths. Specifically, each of one end of the first to fourth terminal supporting groove 75 is open onto the outer circumferential surface 62b of the adapter 62. Further, the other end of the fourth terminal supporting groove 75x is open onto the fourth body supporting groove 74x, and likewise, the other ends of the first to the third terminal supporting groove 75 are respectively open onto the first to third body supporting groove 74.

Figure 7:
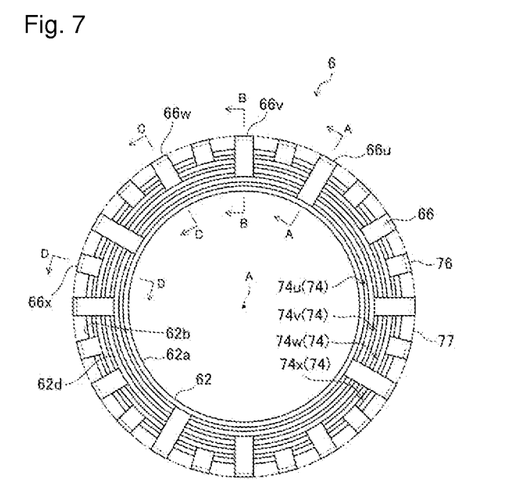
FIG. 7 is a schematic plane view viewing the bus bar unit from the rear surface according to a preferred embodiment of the present invention.

A plurality of body portions 65 and a plurality of terminal bases 66a extending from the body portion 65 are preferably respectively received in the body supporting groove 74, and they are arranged telescopically. A plurality of terminal intermediate portions 66b are respectively received in the terminal supporting groove 75. At this point, since the terminal front end 66c is located to oppose to the body portion 65, it becomes opposed the outer circumferential surface 62b of the adapter 62.

Figure 8:
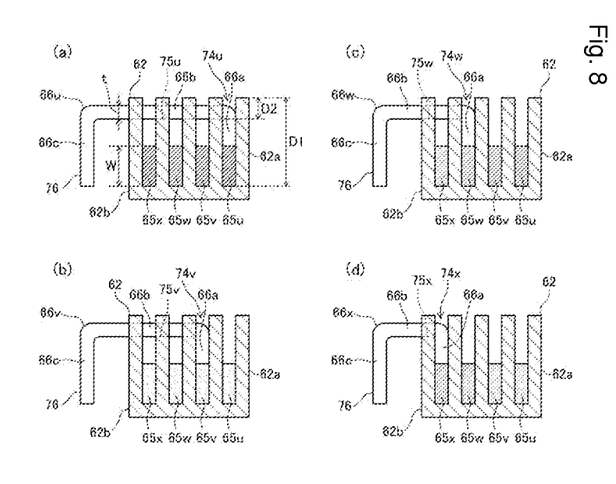
FIG. 8a is a schematic sectional view illustrating a principal portion in line A-A of FIG. 7.
FIG. 8b is a schematic sectional view illustrating a principal portion in line B-B of FIG. 7.
FIG. 8c is a schematic sectional view illustrating a principal portion in line C-C of FIG. 7.
FIG. 8d is a schematic sectional view illustrating a principal portion in line D-D of FIG. 7.

As illustrated in FIG. 8a, the depth D2 of the terminal supporting groove 75 is preferably set to be larger than the thickness t of the terminal portion 66. Accordingly, when the terminal portion 66 is inserted into the adapter 62, the bus bar 61 does not protrude to the rear end surface 62d of the adapter 62, which makes it possible for the bus bar 61 to avoid any contact with other members.

The depth D1 of the body supporting groove 74 is preferably set to be larger than the depth D2 of the terminal supporting groove 75. Further, the difference between the depth D1 of body supporting groove 74 and the depth D2 of the terminal supporting groove 75 is preferably set to be larger than the width W of the body portion 65. The movement of the bus bar 61 received in the body supporting groove 74 is preferably restricted by devices such as, for example, a snap fit provided onto the body supporting groove 74. Accordingly, when a bus bar 61 is received in the adapter 62, the terminal portion 66 of one bus bar 61 spreading across the body portion 65 of the other bus bar 61 is restricted by the terminal supporting groove 75, which ensures prevention of any contact with the body portion 54 of the other bus bar 61.

A junction surface 76 is preferably provided on the radially outward side of the terminal front end 66c of the bus bar 61. Each of the junction surface 76 is disposed to contact a first virtual circle 77 with a center being the central axis A of the adapter 62 bus bar unit 6 in the radially inward side, when each of the junction surface 76 is installed to the adapter 62 see FIG. 7. The wire end 55 is joined to these junction surfaces 76 when the bus bar unit 6 is installed to the stator 5.

As illustrated in FIG. 3, when the bus bar unit 6 is installed to the stator 5, the rear end surface 62d of the adapter 62 is facing the output side end portion 5a of the stator 5. With such configuration, it is possible to prevent the bus bar from being separated from the adapter 62. It is also possible to prevent dust from entering the body supporting groove 74.

Figure 9:
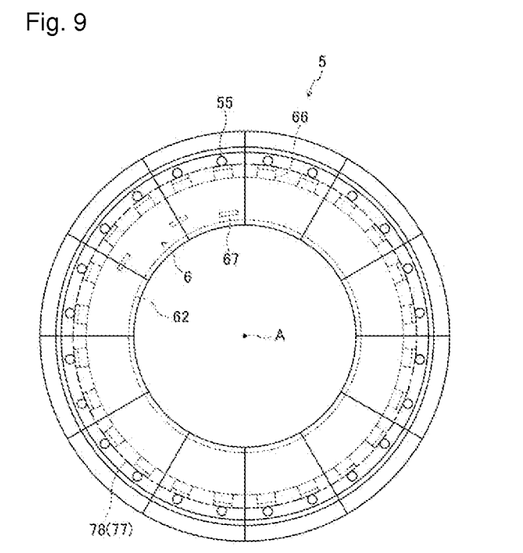
FIG. 9 is a schematic plane view of the stator according to a preferred embodiment of the present invention.

As illustrated in FIG. 9, the wire ends 55 are arranged in equal intervals in a circumferential direction of the stator 5. In the present preferred embodiment, the central angle defined by two adjacent wire ends 55 is preferably about 15 degrees, since the wire end 55 is provided at twenty-four places, for example. Further, the terminal portions 66 of the bus bar unit 6 are provided in accordance with the number or the location of the wire ends 55.

The wire ends 55 are disposed to contact a second virtual circle 78 with a center being the central axis A of the stator 5 in the radially outward side. The second virtual circle 78 is set to have the same diameter with the first virtual circle 77.

Figure 10:
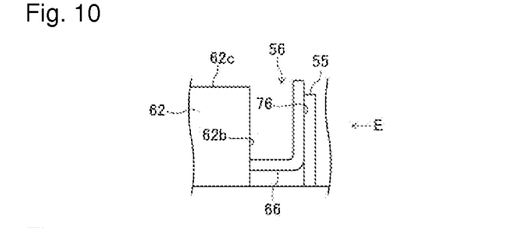
FIG. 10 is a schematic view illustrating a principal portion of the motor according to a preferred embodiment of the present invention.

Accordingly, as illustrated in FIG. 10, when the bus bar unit 6 is installed to the stator 5 to overlap each of central axis A, and the wire end 55 and the terminal portion 66 are aligned in a circumferential direction, the wire end 55 contacts the junction surface 76 of the terminal portion 66 at the radially outward side. It is more preferable to arrange the wire end 55 and the junction surface 76 to face each other with a small interval without making contact.

Figure 11:
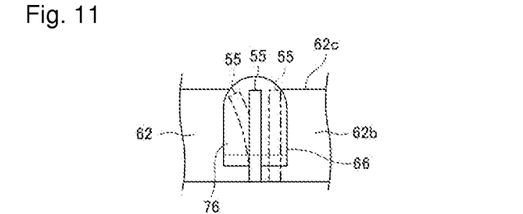
FIG. 11 is a schematic view viewed from the direction of Arrow E illustrated in FIG. 10.

As illustrated in FIG. 11, since the junction surface 76 broadens toward a circumferential direction, the wire end 55 is disposed to face the junction surface 76 even if the location of the wire end 55 is somewhat dislocated or curved. Accordingly, the wire end 55 and the terminal portion 66 can be stably joined, and also the process can be easily made automatic.

When manufacturing a motor 1, a series of processes of installing the bus bar unit 6 to the stator 5 can be mechanized. For example, after assembling the bus bar unit 6 by installing each bus bar 61 to the adapter 62, the bus bar unit 6 is installed to the stator 5 by using a certain assembling device illustration omitted at a location where the junction surface 76 faces the wire end 55 location determining process. For example, after overlapping each of central axis A, the bus bar unit 6 is brought closer to the output side end portion 5a of the stator 5 along the central axis A. Then, the bus bar unit 6 and the stator 5 are rotated with respect to each other in order to determine the location of the wire end 55 and the terminal portion 66 in a circumferential direction. By performing such a procedure, all of the wire ends 55 can simply contact the terminal portion 66.

Figure 12:
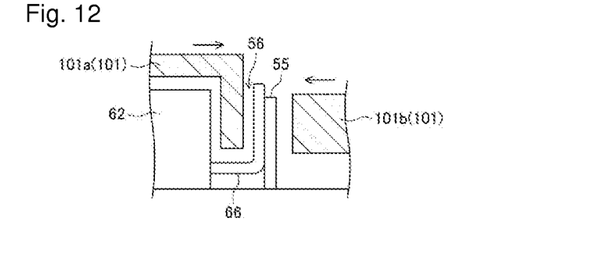
FIG. 12 is a schematic view for explaining the connection between the end portion and the wire end according to a preferred embodiment of the present invention.

Further, as illustrated in FIG. 12, after inserting each terminal front end 66c and each wire end 55 from radially inward and outward side by using an assembling device 101, the wire end 55 is pressured onto the junction surface 76. After this process, it is preferable to weld the wire end 55 and the terminal portion 66 by using methods such as, for example, resistance welding, TIG welding, ultrasonic welding, etc. Since all wire ends 55 can be processed integrally, the number of processes can be reduced, and it is possible to obtain excellent productivity.

In the present preferred embodiment, the wire end 55 and the terminal portion 66 are preferably joined by ultrasonic welding, using the interval 56 provided between the terminal portion 66 and the adapter 62. Specifically, a bonding device 101 preferably includes a first pressure bonding portion 101a and a second pressure bonding portion 101b located at an outer side than the first pressure bonding portion 101a and facing the first pressure bonding portion 101a.

The terminal portion 66 faces the adapter 62 with an interval 56 in a diameter direction. The first pressure bonding portion 101a is received in the interval 56. Further, as indicated by the arrow in FIG. 12, the wire end 55 and the terminal portion 66, which are in contact with each other, are pressured in a diameter direction by the first pressure bonding portion 101a and the second pressure bonding portion 101b, and the wire end 55 and the terminal portion 66 are joined by applying ultrasonic vibration.

Figure 13:
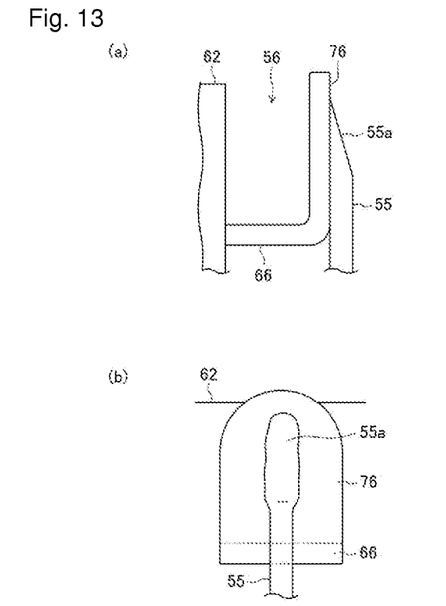
FIG. 13a is a schematic side view illustrating the region where the end portion and the wire end are joined according to a preferred embodiment of the present invention.
FIG. 13b is a schematic front view illustrating the region where the end portion and the wire end are joined according to a preferred embodiment of the present invention.

FIG. 13 illustrates a specific example of the region where the wire end 55 and the terminal portion 66 are joined. According to the present preferred embodiment, the joined region of the wire end 55 and the terminal portion 66 preferably includes an inclined surface 55a.

Specifically, the inclined surface 55a is defined so that the thickness in the diameter direction of the wire end 55 becomes gradually thinner toward the front end side of the wire end 55 in the axial direction. By performing ultrasonic welding to define the inclined surface 55a in the joined region of the wire end 55, the front end of the wire end 55 is joined with the terminal portion 66, the front end being spread out. As a result, the wire end 55 and the terminal portion 66 can preferably be joined more strongly and firmly. Since the joining strength between the wire end 55 and the terminal portion 66 gradually becomes stronger toward the front end side, a stable connection having a strong durability against vibration, etc. can be realized.

Figure 14:
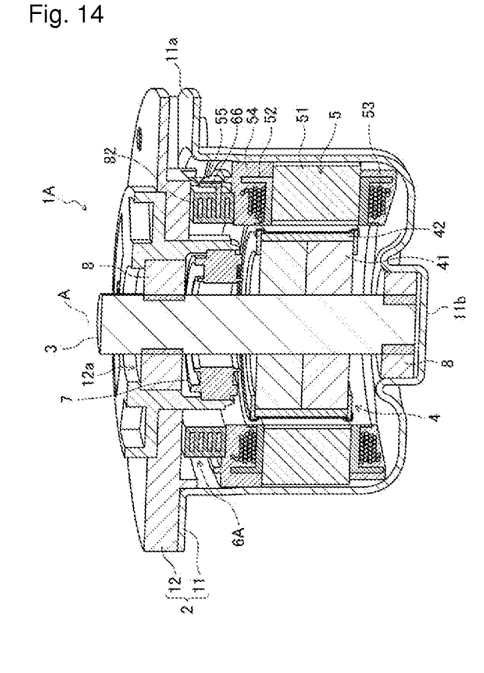
FIG. 14 is a schematic sectional view illustrating the motor according to another preferred embodiment of the present invention.

FIG. 14 illustrates a motor according to another preferred embodiment of the present invention. The motor 1A according to the present preferred embodiment preferably includes a bus bar unit 6 with a different configuration from that described above in the motor 1 of the previous preferred embodiment. Hereinafter, the constitution that has an identical function as the motor 1 according to the previous preferred embodiment will be referred to as identical symbols, without detailed explanation. Only the differences will be specifically explained.

Figure 15:
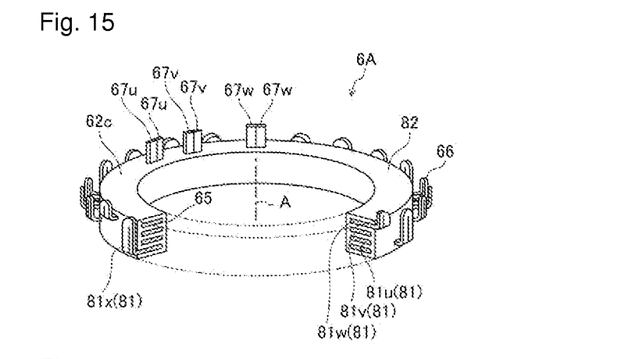
FIG. 15 is a schematic perspective view illustrating the bus bar unit according to another preferred embodiment of the present invention. Portions of the bus bar unit are omitted in order to show the inner structure.

FIG. 15 illustrates the bus bar unit 6A according to the present preferred embodiment. The bus bar unit 6A includes a plurality of bus bar 81 (preferably four in this preferred embodiment, for example) and an insulating adapter 82 which supports these bus bars 81. The bus bar 81 according to the present preferred embodiment also includes three phase bus bars 81*u*, 81*v*, 81*w* that are respectively connected to the U-phase, V-phase, W-phase of the stator 5, and a common bus bar 81*x* that is connected to a neutral point.

Figure 16:
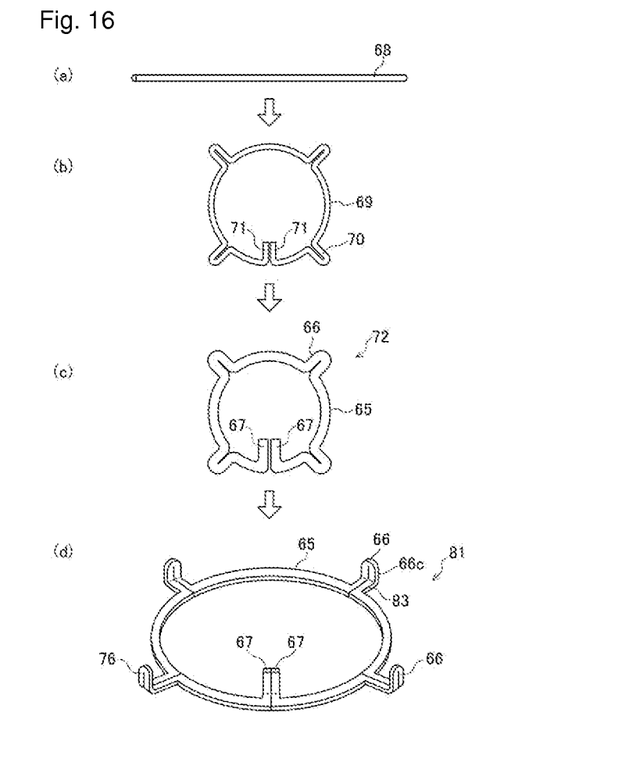
FIG. 16a is a schematic view illustrating the bus bar and the manufacturing process thereof in another preferred embodiment of the present invention.
FIG. 16b is a schematic view illustrating the bus bar and the manufacturing process thereof in another preferred embodiment of the present invention.
FIG. 16c is a schematic view illustrating the bus bar and the manufacturing process thereof in another preferred embodiment of the present invention.
FIG. 16d is a schematic view illustrating the bus bar and the manufacturing process thereof in another preferred embodiment of the present invention.

As illustrated in FIG. 16*d*, the body portion 65 of the bus bar 81 of the present preferred embodiment is preferably curved into a ring shape not in the thickness direction, but in the width direction. The terminal portion 66 includes a terminal protrusion portion 83 and a terminal front end 66*c*. The terminal protrusion portion 83 protrudes from the lateral end of the outer circumferential side of the body portion 65 to the radially outward side and extends to be parallel or approximately parallel to the body portion 65. The terminal front end 66*c* extends from the terminal protrusion portion 83 to be parallel or approximately parallel to the terminal protrusion portion 83. These bus bars are also preferably formed by processing a single bare copper wire 68.

When manufacturing the bus bar according to the present preferred embodiment, a single bare copper wire 68 is prepared as illustrated in FIG. 16*a*. Then, as illustrated in FIG. 16*b*, the bare copper wire 68 is bent to form a body forming portion 69 to form the body portion 65, a terminal forming portion 70 to form the terminal portion 66, and a connecting end forming portion 71 to form the connecting end portion 67.

Specifically, a plurality of terminal forming portions 70 are formed by the same process as the previous preferred embodiment. Four terminal forming portions 70 are preferably formed in a phase bus bar 81, and twelve terminal forming portions 70 are preferably formed in a common bus bar 81*x*, for example. The body forming portion 69 is preferably formed by bending the bare copper wire 68 into a ring shape. All terminal forming portions 70 are disposed on the radially outward side of the body forming portion 69. The connecting end forming portion 71 is disposed on the opposite side of the terminal forming portion 70, that is, on the radially inward side of the body forming portion 69.

Subsequently, as illustrated in FIG. 16*c*, the whole bare copper wire 68, where the terminal forming portion 70 is formed, is rolled to form a strip plate shaped intermediate member 72. As illustrated in FIG. 16*d*, a certain region of the intermediate member 72 is bent. Specifically, the intermediate portion of each terminal portion 66 is bent by approximately 90 degrees to form the terminal protrusion portion 83 and the terminal front end 66*c*. In the present preferred embodiment, the terminal protrusion portion 83 corresponds to the terminal protrusion portion 63 and a pair of extending portions 66*s*.

The terminal forming portion 70 in each bus bar 81 is preferably respectively set to have a different length. In the present preferred embodiment, the terminal protrusion portion 83 is formed to have the same length, and the terminal front end 66*c* in each bus bar is formed to have a different length. Also, all the body forming portions 69 in each bus bar according to the present preferred embodiment are formed to have the same length. Accordingly, the body portion 65 in each bus bar 81 is respectively formed to have the same diameter.

The terminal forming portion 70 of the common bus bar 81*x* according to the present preferred embodiment is preferably longer than that of the phase bus bar 81. Accordingly, the terminal front end 66*c* of the common bus bar 81*x* is set to be longer than that of the phase bus bar 81. The terminal forming portion 70 of a common bus bar 81*x* may be shorter than that of the phase bus bar 81. By such configuration, although the common bus bar 81*x* has more terminal portions 66 than the phase bus bars 61, it becomes possible to reduce the consumed amount of the bare copper wire 68 by making the size of terminal portions 66 relatively shorter.

In the present preferred embodiment, the bus bar 81 is preferably integrally provided with the adapter 82. Specifically, the body portion 65 of the bus bar 81 is layered inside the adapter 82 with a resin layer interposing between the adjacent bus bars 81 without making contact with the adjacent bus bar. The terminal front end 66*c* of each bus bar 81 is arranged to have a different length in accordance with the layered position. Accordingly, the portion of each terminal front end 66*c* protruding from the top end surface 62*c* of the adapter 82 is preferably set to be approximately identical. Further, the portion of each terminal front end 66*c* protruding from an outer circumferential surface 62*b* of the adapter 82 is set to be identical. By such configuration, a junction surface 76 is in contact with a first virtual circle 77.

Figure 17:
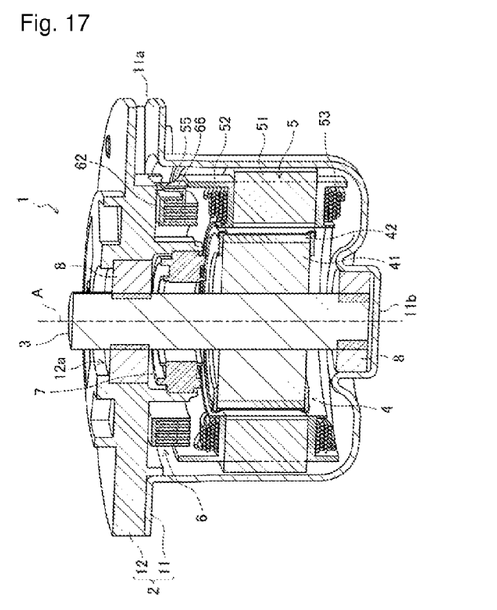
FIG. 17 is a schematic view illustrating a modified preferred embodiment of the motor of the present invention.

Also, the bus bar according to the present preferred embodiment is not limited by the described example, and further includes other various modifications. For example, most of the stators 5 of the motor according to the above preferred embodiment are preferably embedded in a resin layer 54 by a molding process. However, as illustrated in FIG. 17, a preferred embodiment of the present invention is also applicable to motors without a resin layer 54.

Figure 18:
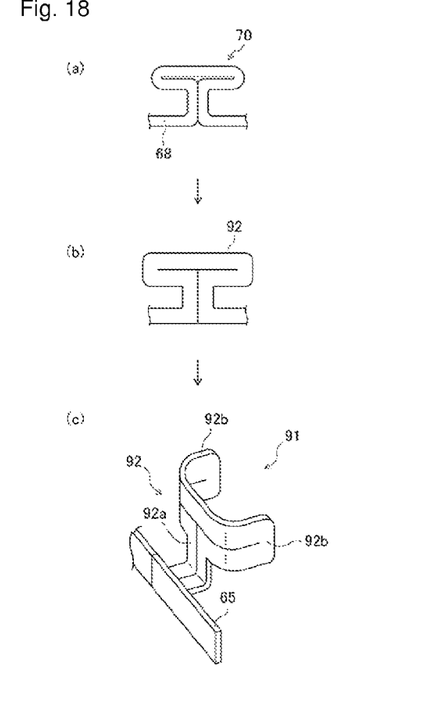
FIG. 18a is a schematic view illustrating a modified preferred embodiment of the bus bar of the present invention and the manufacturing process thereof.
FIG. 18b is a schematic view illustrating a modified preferred embodiment of the bus bar of the present invention and the manufacturing process thereof.
FIG. 18c is a schematic view illustrating a modified preferred embodiment of the bus bar of the present invention and the manufacturing process thereof.

Further, some configuration of the terminal portion 66 of the bus bar 61 can be appropriately modified if necessary. FIG. 18*c* illustrates a bus bar 91 according to a modified preferred embodiment. The terminal portion 92 of the bus bar 91 is formed so that a wire end 55 can be pressured and joined thereto. That is, the terminal portion 92 preferably includes a terminal base 92*a* extending from the body portion 65 and protruding toward a lateral direction, and a pair of terminal arm portions 92*b* protruding toward a lateral direction from each side of the front end of the terminal base 92*a*. The terminal portion 92 and the wire end 55 are joined by wrapping the wire end 55 between these terminal arm portions 92*b* and by winding and tightening the terminal arm portion 92*b*.

For producing the terminal portion 92, for example, a terminal forming portion 70 is preferably formed by bending the bare copper wire 68 into an approximately T-shape, as illustrated in FIG. 18*a*. After that, by performing a rolling process, an intermediate body having a layout shape of the terminal portion 92 can be obtained as illustrated in FIG. 18*b*. Afterward, a certain region of the intermediate body is bent.

The connection of each coil in the above preferred embodiments is not limited to a Y-connection, and the connection can alternatively be a delta connection if so desired. Also, it can be applied to a series connection which connects the coil to each phase in series, or a series parallel connection which further connects a group of coils that are series-connected to each phase in parallel. The material of a bus bar wire rod is not limited to a copper wire if the material is conductive. For example, since an aluminum wire is lighter and more inexpensive than a copper wire, it can be effectively applied. Especially, when the same material used in the conductive line of the coil is employed, the quality of connection can be enhanced since the property between the two materials is identical.

The shape of the adapter or the body portion of the bus bar is not limited to a ring shape. The shape can be a circular arc, a polygon, or an indeterminate form.

The bus bar or the motor of preferred embodiments of the present invention can be used in a vehicle on-board motor, and for example, is suitable for a vehicle on-board electromotive power steering device.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor, comprising:
a rotatably supported shaft;
a rotor integrally provided with the shaft;
a stator arranged to surround the rotor, the stator including
  a coil defined by a winding including a plurality of conductive lines; and
a bus bar affixed to one axial end of the stator and electrically connected to a plurality of end portions of the plurality of conductive lines; wherein
the bus bar includes:
  a body portion having a plate shape; and
  a plurality of terminal portions having a plate shape and being integrally provided with the body portion to define a single monolithic member and to overlap with the plurality of end portions of the plurality of conductive lines in an axial direction each of the plurality of terminal portions includes:
    a terminal protrusion portion defined by a pair of extending portions which protrude in a lateral direction from the body portion, facing each other; and
    a terminal front end extending from an end portion of the terminal protrusion portion in parallel or substantially in parallel to the shaft; wherein
    the terminal front end includes a junction surface in which two portions of the terminal portion contact; and
    the end portion of the conductive line is joined to the junction surface.

2. The motor according to claim 1, further comprising:
a plurality of the bus bars; and
an insulating adapter which is attached to the one axial end of the stator and supports each of the plurality of bus bars; wherein
the body portions of the plurality of bus bars are curved into a ring shape or an arch shape in a thickness direction to correspond to the shape of the adapter;
the terminal protrusion portions include a terminal intermediate portions orthogonal or approximately orthogonal to the body portions;
the terminal front ends include a portion orthogonal or approximately orthogonal to the terminal protrusion portions; and
the of body portions are arranged inside the adapter telescopically.

3. The motor according to claim 2, wherein
a plurality of body supporting grooves which respectively receive the plurality of body portions and a plurality of terminal supporting grooves which respectively receive the plurality of terminal intermediate portions are provided on one end surface of the adapter, the body supporting grooves are provided around the shaft;
the terminal supporting grooves cross the body supporting grooves; and
a depth of the body supporting grooves is deeper than a depth of the terminal supporting grooves, and a difference between the depth of the body supporting grooves and the depth of the terminal supporting grooves is larger than a width of the body portion.

4. The motor according to claim 3, wherein the terminal front end is located on the opposite side of the body portion in a radial direction, and the adapter is attached to the stator, with the end surface arranged to face the one axial end of the stator.

5. The motor according to claim 2, wherein
the stator is has a cylindrical or substantially cylindrical shape;
the end portions of the plurality of conductive lines are arranged in a circumferential direction;
the adapter and the body portion have a circular ring or a circular arc shape;
the terminal portion is arranged correspondingly to locations of the end portions of the plurality of conductive lines.

6. The motor according to claim 5, wherein each of the end portions of the plurality of conductive lines is arranged to contact with a first virtual circle;
each of the junction surfaces is arranged in a location to contact with a second virtual circle;
the second virtual circle has a same diameter as the first virtual circle; and
the first virtual circle and the second circle coincide with each other when the plurality of bus bars and the adapter are installed to the stator.

7. The motor according to claim 2, wherein the plurality of conductive lines are joined to the junction surfaces of the terminal portions of the plurality of bus bars by ultrasonic welding;
an inclined surface is provided on a joined region in end portions of the plurality of conductive lines;
a thickness in the diameter direction of the plurality of conductive lines becomes thinner as the inclined surface proceeds to one end side in an axial direction of the plurality of conductive lines; and
the junction surfaces are broadened toward a circumferential direction.

8. The motor according to claim 2, wherein
the coil is embedded in a resin material; and
the end portions of the plurality of conductive lines are led out from the resin material.

9. The motor according to claim 1, further comprising:
a plurality of the bus bars; and
an insulating adapter which is attached to the one axial end of the stator and supports each of the plurality of bus bars; wherein
the body portions of the plurality of bus bars are shaped to correspond to a shape of the adapter;
the terminal protrusion portions include a portion extending in parallel or approximately in parallel to the body portions;
the terminal front ends include a portion orthogonal or approximately orthogonal to the terminal protrusion portions; and
the plurality of body portions are layered inside the adapter, without making contact with each other.

10. The motor according to claim 9, wherein
the stator has a cylindrical or substantially cylindrical shape;
the end portions of the plurality of conductive lines are arranged in a circumferential direction;
the adapter and the body portion have a circular ring or a circular arc shape; and the terminal portion is arranged correspondingly to locations of the end portions of the plurality of conductive lines.

11. The motor according to claim 10, wherein each of the end portions of the plurality of conductive lines is arranged to contact with a first virtual circle;

each of the junction surfaces is arranged to contact with a second virtual circle;

the second virtual circle has a same diameter as the first virtual circle; and the first virtual circle and the second circle coincide when the plurality of bus bars and the adapter are installed to the stator.

12. A method for manufacturing the bus bar according to claim 1, the method comprising the steps of:

folding an intermediate region of a single wire rod to form a plurality of terminal forming portions which protrude toward a lateral direction of the wire rod;

rolling the whole wire rod including the terminal forming portion; and bending the rolled wire rod into a certain shape.

13. The method for manufacturing the bus bar according to claim 12, further comprising the step of:

rolling the whole wire rod including the terminal forming portion; and bending the rolled wire rod into a certain shape.

14. The method for manufacturing the bus bar according to claim 13, further comprising the step of:

bending the rolled wire rod in a thickness direction to bring the two of rolled connecting end forming portions into contact with each other and to form the wire rod in a circular ring or a circular arc shape.

* * * * *